(12) United States Patent
Tanaka

(10) Patent No.: US 7,465,648 B2
(45) Date of Patent: Dec. 16, 2008

(54) LASER IRRADIATION APPARATUS AND METHOD FOR MANUFACTURING SEMICONDUCTOR DEVICE

(75) Inventor: Koichiro Tanaka, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 808 days.

(21) Appl. No.: 10/980,433

(22) Filed: Nov. 4, 2004

(65) Prior Publication Data

US 2005/0111105 A1  May 26, 2005

(30) Foreign Application Priority Data

Nov. 20, 2003  (JP)  ............... 2003-391443

(51) Int. Cl.
*H01L 21/20*  (2006.01)
*H01L 21/4763*  (2006.01)

(52) U.S. Cl. ............ 438/487; 438/622; 438/795; 257/E21.413

(58) Field of Classification Search .......... 438/487, 438/622, 795, 796, 797, 798, 799; 257/E21.413
See application file for complete search history.

(56) References Cited

U.S. PATENT DOCUMENTS

| | | | |
|---|---|---|---|
| 6,300,176 B1 | 10/2001 | Zhang et al. | |
| 6,689,651 B2 | 2/2004 | Zhang et al. | |
| 6,750,424 B2 | 6/2004 | Tanaka | |
| 6,809,021 B2 * | 10/2004 | Ohtani et al. | 438/622 |
| 6,943,086 B2 * | 9/2005 | Hongo et al. | 438/308 |
| 7,101,436 B2 * | 9/2006 | Taniguchi et al. | 117/200 |
| 7,369,215 B2 * | 5/2008 | Takami | 355/67 |
| 2003/0016349 A1 * | 1/2003 | Tsumura et al. | 356/237.2 |

FOREIGN PATENT DOCUMENTS

JP  08-088196  4/1996

* cited by examiner

*Primary Examiner*—Scott B. Geyer
*Assistant Examiner*—Seahvosh J Nikmanesh
(74) *Attorney, Agent, or Firm*—Eric J. Robinson; Robinson Intellectual Property Law Office, P.C.

(57) ABSTRACT

When a rectangular image having homogeneous intensity distribution is transferred by an imaging optical system, aberration adversely affects the homogeneity of the intensity distribution. The present invention provides a laser irradiation apparatus that can suppress the aberration due to the imaging optical system typified by a cylindrical lens, that can enlarge the square measure of the beam spot in which the intensity distribution is homogenous, and that can anneal the irradiated surface homogeneously efficiently. Moreover, the present invention provides a method for manufacturing a semiconductor device with the use of the laser irradiation apparatus. In the present invention, the divergence of the laser beam is suppressed and the size of the imaging optical system is miniaturized by using an off-axis lens array such as an off-axis cylindrical lens array. By the miniaturization, it is possible to reduce the cost, to facilitate the maintenance, and to suppress the aberration. By suppressing the aberration, the homogeneity of the intensity distribution of the beam spot can be improved.

20 Claims, 12 Drawing Sheets

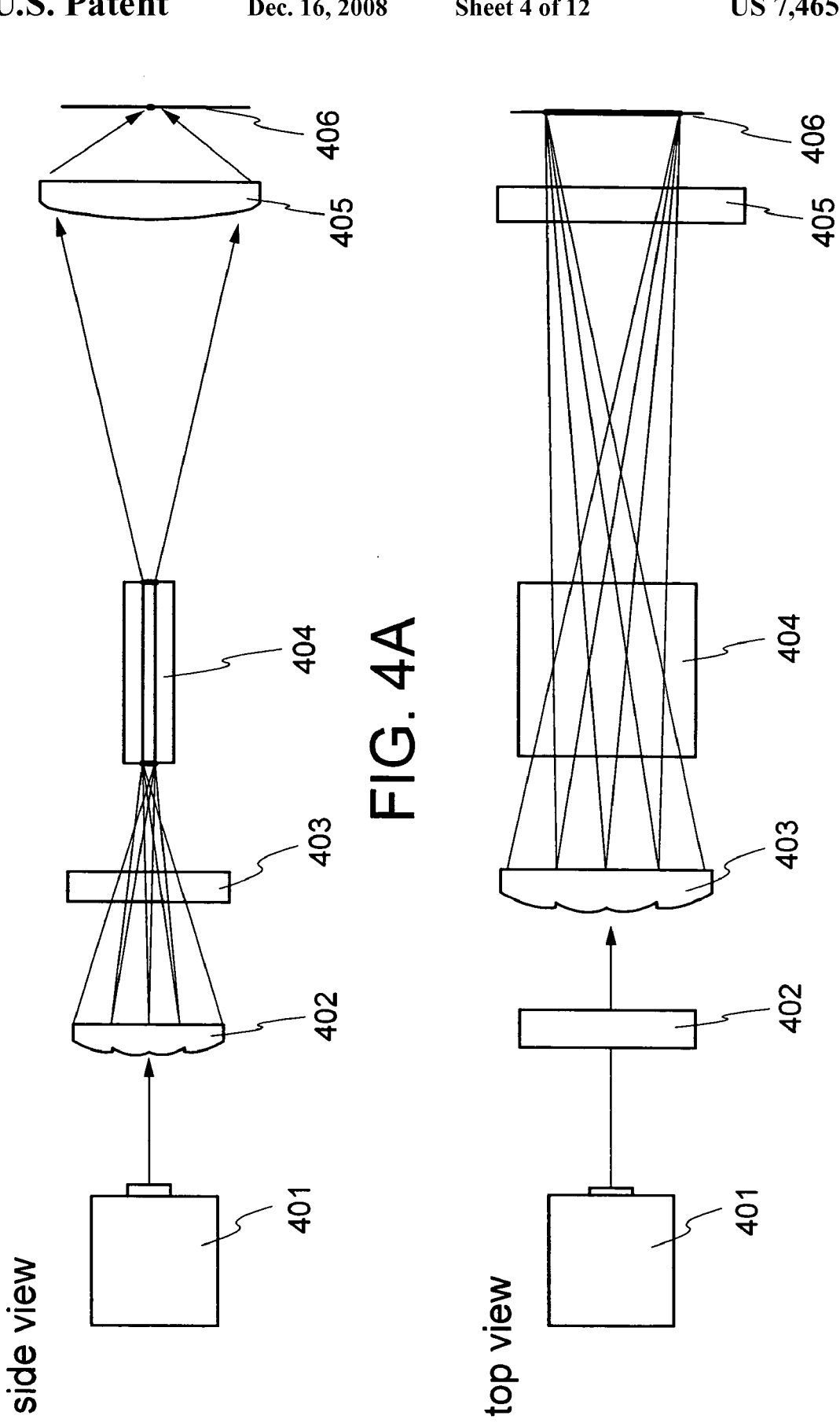

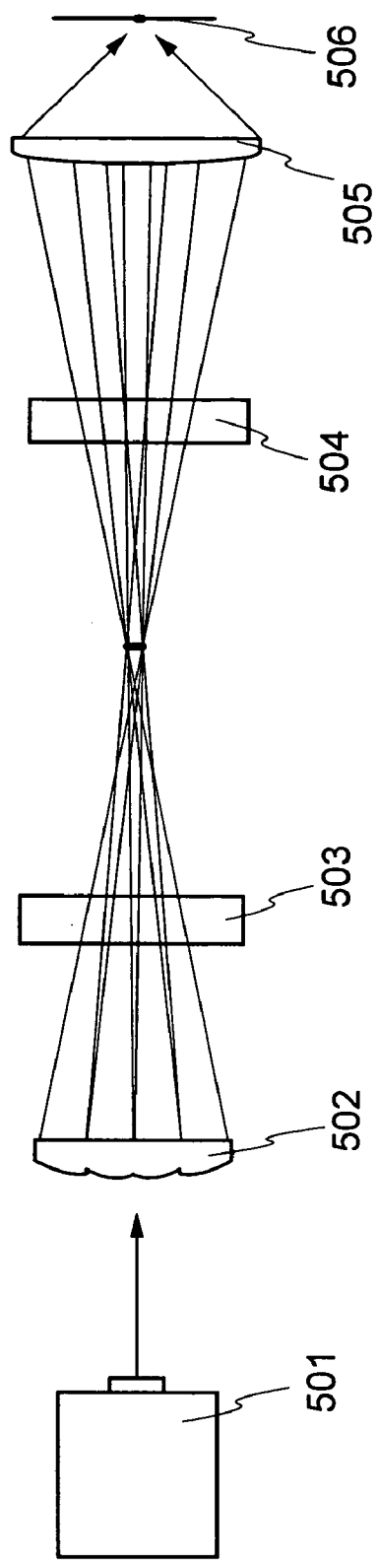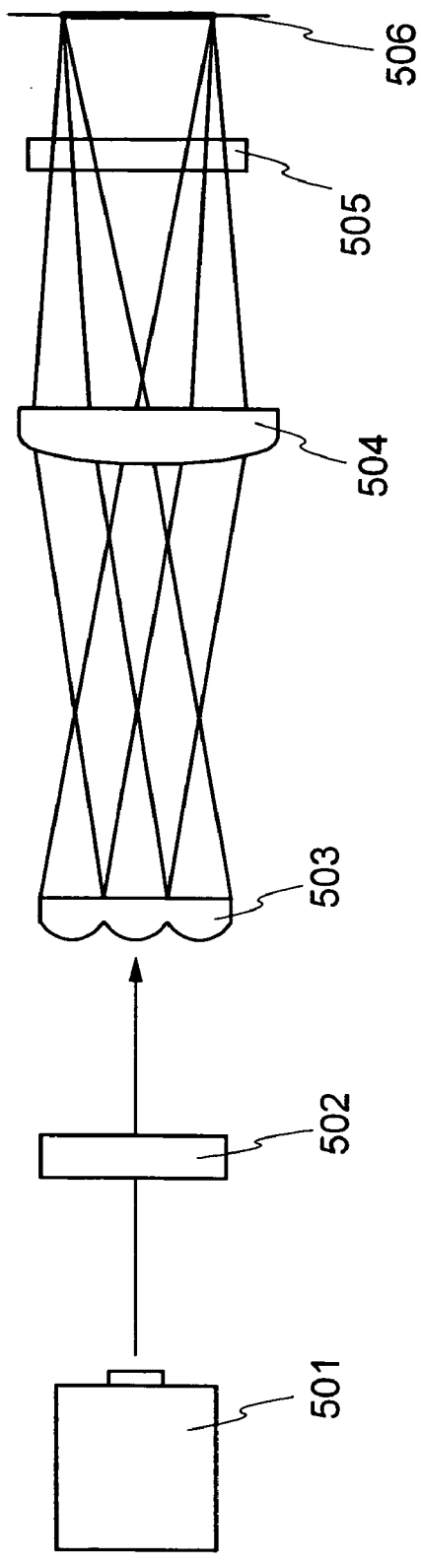
FIG. 5A  side view
FIG. 5B  top view

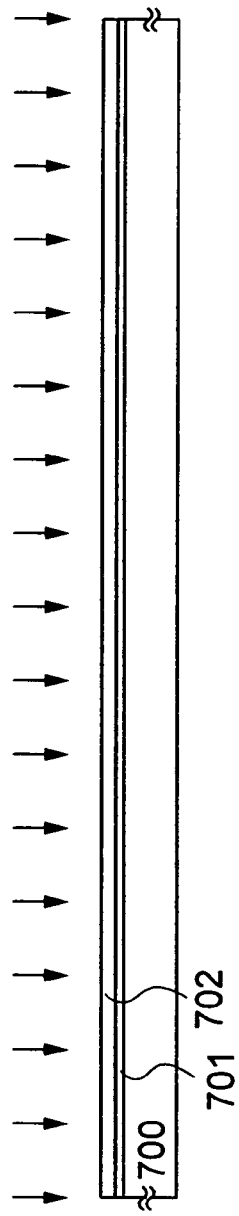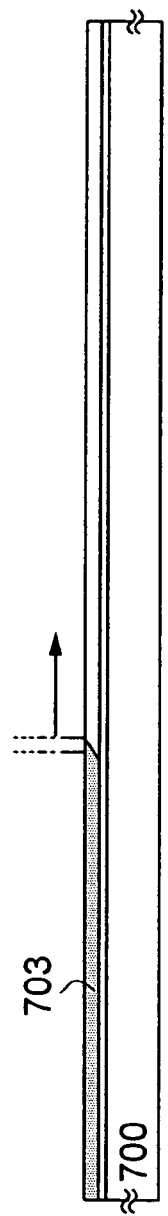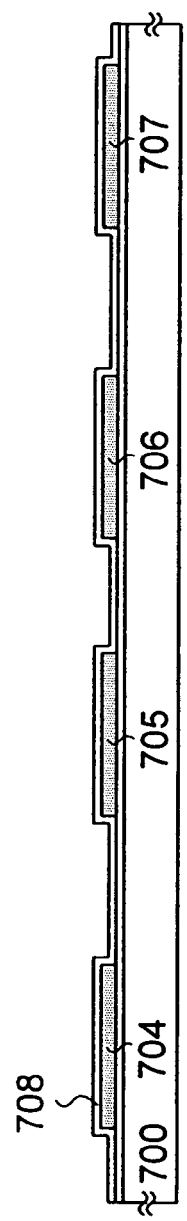

LASER IRRADIATION APPARATUS AND METHOD FOR MANUFACTURING SEMICONDUCTOR DEVICE

BACKGROUND OF THE INVENTION

1. Field of the Invention

The present invention relates to a laser irradiation apparatus and a method for manufacturing a semiconductor device with the use of the laser irradiation apparatus.

2. Description of the Related Art

In recent years, a technique to form a thin film transistor (hereinafter referred to as a TFT) over a substrate has made great progress, and application development to an active matrix display device has been advanced. Particularly, a TFT formed using a poly-crystalline semiconductor film is superior in field-effect mobility to a TFT formed using a conventional amorphous semiconductor film, and therefore high-speed operation becomes possible when the TFT is formed using the poly-crystalline semiconductor film. For this reason, a circuit for driving a pixel, which has been mounted by an external IC chip, can be formed integrally with the pixel over the same substrate by the TFT.

The poly-crystalline semiconductor film suitable for manufacturing a TFT is obtained by crystallizing an amorphous semiconductor film. To crystallize the amorphous semiconductor film, a laser annealing method is generally employed. The laser annealing is more preferable than a general thermal annealing that requires a temperature as high as 600° C. or more. This is because an inexpensive glass substrate, which is often employed as a substrate of TFT, is inferior in heat resistance and is easy to change in shape due to the heat. That is to say, the laser annealing has advantages that the processing time can be shortened to a large degree compared with another annealing method using radiation heat or conduction heat and that a semiconductor substrate or a semiconductor film on a substrate can be heated selectively and locally so that the substrate is hardly damaged thermally. Therefore, the laser annealing method is widely used to crystallize the amorphous semiconductor film formed over the glass substrate.

It is noted that the laser annealing method described herein includes the technique to recrystallize an amorphous layer or a damaged layer formed in the semiconductor substrate or the semiconductor film and the technique to crystallize an amorphous semiconductor film formed over the substrate. In addition, the technique to flatten or modify the surface of the semiconductor substrate or the semiconductor film is also included.

In the laser oscillators, there are a pulsed laser oscillator and a continuous wave laser oscillator according to the oscillation method. The laser annealing often uses a laser beam oscillated from the pulsed laser oscillator typified by an excimer laser. This is because the pulsed laser oscillator has an output power per unit time that is approximately three to six digits higher than that of the continuous wave laser oscillator. It is preferable to perform the laser annealing in such a way that a beam spot (a region irradiated by the laser beam in a surface of a processing object) is shaped into a square having a length of several cm on a side or into a line having a length of 100 mm or more through an optical system and that the beam spot is moved relative to the irradiated surface because this method provides high productivity and is superior industrially. (For example, refer to a patent document 1) For this reason, the pulsed laser oscillator is mainly used to crystallize the semiconductor film. It is noted that a laser beam having a rectangular shape on the irradiated surface is referred to as a rectangular beam, and a laser beam having a linear shape on the irradiated surface is referred to as a linear beam.

[Patent Document1] Japanese Patent Laid-Open No. H08-088196

It is noted that the term of linear herein used does not mean a line in a strict sense but means a rectangle having a large aspect ratio (or an oblong). For example, the rectangle having an aspect ratio of 2 or more (preferable in the range of 10 to 10000) is referred to as the line. It is noted that the linear is still included in the rectangular.

Since the laser beam emitted from the laser oscillator generally has Gaussian distribution in which the intensity of the laser beam is attenuated from the center toward the end portion, it is necessary to homogenize the intensity distribution of the laser beam on the irradiated surface in order to perform the homogeneous laser annealing. In recent years, in order to homogenize the intensity distribution, a method is often employed in which a cylindrical lens array is used to divide the laser beam in a predetermined direction and the divided laser beams are superposed in the same surface. According to this method, a rectangular beam can be formed which has a length of 300 mm or more in a direction of its long side and a length of 1 mm or less in a direction of its short side, and therefore it has become possible to perform the laser annealing efficiently to the semiconductor film formed over a large substrate.

A general method for homogenizing the intensity distribution of the laser beam emitted from the laser oscillator by a cylindrical lens array is explained with reference to FIGS. 6A and 6B. FIGS. 6A and 6B show simply the structure in which a cylindrical lens array and a cylindrical lens are used in combination to form a linear beam on an irradiated surface. It is noted that the linear beam formed on an irradiated surface 608 in FIG. 6A has a short side in a direction that is parallel to the paper. In a side view of FIG. 6A, a laser oscillator 601 is a XeCl excimer laser. A laser beam emitted from the laser oscillator 601 is incident into a cylindrical lens array 602 and divided into four. After that, the divided beams are combined once into one beam spot by a cylindrical lens 604 to form an image having homogeneous intensity distribution. Then, the beam spots separated again are reflected by a mirror 606 and condensed into one beam spot again by a cylindrical lens 607. After that, the laser beam is irradiated to an irradiated surface 608. Thus, the linear beam having the intensity distribution homogenized in a direction of its short side is formed on the irradiated surface 608 and the length thereof in the direction of its short side is determined.

Next, a top view of FIG. 6B is explained. The beam spot of the laser beam emitted from the laser oscillator 601 is divided into three by a cylindrical lens array 603. After that, the beam spots divided into three are combined into one beam spot on the irradiated surface 608 by a cylindrical lens 605. A dotted line behind the mirror 606 shows a correct optical path and correct positions of the lens and the irradiated surface in the case not providing the mirror 606. This homogenizes the intensity distribution of the beam spot shaped into linear in the direction of its long side and determines the length thereof in the direction of the long side.

The linear beam spot transformed by the above structure is irradiated as being overlapped in such a way that the linear beam spot is displaced gradually in the direction of the short side of the linear beam spot. With such irradiation performed, the laser annealing can be performed to the whole surface of the non-single crystal silicon film so as to crystallize it or to enhance its crystallinity for example.

However, when the cylindrical lens transfers the image having homogeneous intensity distribution to the irradiated surface, the homogeneity of the intensity distribution of the beam spot formed on the irradiated surface is adversely affected by the aberration. FIG. 2 is an enlarged view of a structure in which the intensity distribution of the linear beam is homogenized in a direction of its short side by a cylindrical lens array and two cylindrical lenses. The laser beams divided into four by a cylindrical lens array 201 are combined into one beam spot by a cylindrical lens 202. The intensity distribution is homogenized in the combined beam spot. This beam spot is transferred to an irradiated surface by a cylindrical lens 203, which is also referred to as an imaging optical system. On this occasion, in consequence of the aberration depending on the incident height of the respective rays in the laser beam incident into the cylindrical lens 203, the rays are focused at the different points as shown in FIG. 2. This makes it difficult to enlarge a region having homogeneous intensity distribution in the whole area of the beam spot. As a result, when the laser annealing process is performed using the semiconductor film as the irradiated surface, the aberration causes a problem of low throughput because the region that can be annealed by the beam spot having the homogeneous intensity distribution is not large.

SUMMARY OF THE INVENTION

Consequently, it is an object of the present invention to provide a laser irradiation apparatus that can suppress the aberration due to the imaging optical system typified by a cylindrical lens, that can enlarge the area of the beam spot in which the intensity distribution is homogenous on an irradiated surface, and that can perform efficiently the homogeneous annealing to the irradiated surface. Moreover, it is an object of the present invention to provide a method for manufacturing a semiconductor device using the laser irradiation apparatus.

The present invention discloses a laser irradiation apparatus including a laser oscillator, an off-axis lens array, and an imaging optical system, wherein a laser beam emitted from the laser oscillator is divided and superposed on a predetermined plane by the off-axis lens array so as to form an image having homogeneous intensity distribution on the predetermined plane and wherein the image having the homogeneous intensity distribution is transferred to an irradiated surface by the imaging optical system provided behind the predetermined plane. The off-axis lens array may be designed in accordance with the desired size and position of the image.

In the present invention, the image having the homogeneous intensity distribution is rectangular.

In the present invention, an off-axis cylindrical lens array is used as the off-axis lens array, and a cylindrical lens is used as the imaging optical system.

In the present invention, the off-axis cylindrical lens array and the cylindrical lens have curvature in a direction of a short side of the rectangular image. When the short side of the rectangular image is made shorter, the long side of the rectangular image can be made longer accordingly. Therefore, it is possible to enlarge the region annealed by one scanning of the rectangular beam spot and to increase the throughput. Specifically, when a semiconductor device is manufactured over a large substrate, the length of the linear beam in the direction of its long side can be made longer in accordance with the size of the substrate so that the annealing can be performed as few scanning times as possible. Therefore, it is possible to process a large number of substrates in a short time and to increase the throughput.

The off-axis lens herein described means a lens whose principle point is not center of the lens.

According to the present invention, in the case where the imaging optical system transfers the image having the homogeneous intensity distribution formed once by the off-axis lens array, the divergence of the image can be made small. Therefore, the imaging optical system can be miniaturized to a large degree compared with the conventional one. By miniaturizing the imaging optical system, it is possible to reduce the cost, to facilitate the maintenance, and to suppress the aberration. When the aberration is suppressed, it is possible to enlarge the area in the beam spot having homogeneous intensity distribution on the irradiated surface. In addition, when the laser annealing is performed using the semiconductor film as the irradiated surface, the homogeneous crystallinity can be obtained all over the semiconductor film because the beam spot having homogeneous intensity distribution can be formed.

The present invention discloses a laser irradiation apparatus including a laser oscillator and an off-axis cylindrical lens array for dividing a laser beam emitted from the laser oscillator and for superposing divided laser beams on an irradiated surface so as to form a rectangular image having homogeneous intensity distribution on the irradiated surface, wherein the off-axis cylindrical lens array has curvature in a direction of a long side of the rectangular image.

The present invention discloses a method for manufacturing a semiconductor device including the steps of forming a non-single crystal semiconductor film over a substrate and performing laser annealing to the non-single crystal semiconductor film in such a way that a laser beam is divided and superposed on a predetermined plane by an off-axis lens array so as to form an image having homogeneous intensity distribution on the predetermined plane and that the image having the homogeneous intensity distribution is transferred to the non-single crystal semiconductor film by an imaging optical system positioned behind the predetermined plane.

In the present invention, the image having the homogeneous intensity distribution is rectangular.

In the present invention, an off-axis cylindrical lens array is used as the off-axis lens array and a cylindrical lens is used as the imaging optical system.

In the present invention, the off-axis cylindrical lens array and the cylindrical lens have the curvature in a direction of a short side of the rectangular image.

The present invention discloses a method for manufacturing a semiconductor device including the steps of forming a non-single crystal semiconductor film over a substrate and performing laser annealing to the non-single crystal semiconductor film in such a way that a laser beam is divided and superposed on the non-single crystal semiconductor film by an off-axis cylindrical lens array so as to form a rectangular image having homogeneous intensity distribution on the non-single crystal semiconductor film, wherein the cylindrical lens array have curvature in a direction of a long side of the rectangular image.

In the present invention, the laser beam is emitted from an excimer laser.

The present invention provides the following advantageous effects. First, the divergence of the laser beam incident into the imaging optical system can be suppressed by using the off-axis lens array. Therefore, the imaging optical system can be miniaturized. By miniaturizing the imaging optical system, it is possible to reduce the cost and to facilitate the maintenance. Second, since the imaging optical system can be miniaturized, the aberration can be suppressed and the region in the beam spot having homogeneous intensity distribution can be enlarged. As a result, it is possible to minimize the region in the linear beam having inhomogeneous intensity distribution especially in the direction of the short side. When the annealing is performed using the substrate with the semiconductor film formed thereover and using the longer linear beam, more substrates can be processed in a short time, and therefore the throughput can be increased. In addition, since the aberration can be suppressed, the beam spot having homogeneous intensity distribution can be formed. Therefore, homogeneous annealing can be performed to obtain the homogeneous crystallinity.

BRIEF DESCRIPTION OF THE DRAWINGS

FIGS. 4A and 4B are drawings for explaining the Embodiment 2 of the present invention;

FIGS. 5A and 5B are drawings for explaining the Embodiment 3 of the present invention;

FIGS. 7A to 7C are drawings for showing manufacturing processes of the thin film transistor;

DETAILED DESCRIPTION OF THE INVENTION

An embodiment mode of the present invention is explained with reference to FIGS. 1 and 2. First, an off-axis cylindrical lens array used in the present embodiment mode is explained with reference to FIG. 1. The off-axis cylindrical lens array has a cylindrical lens whose generating line that is farthest from the plane surface of the cylindrical lens is not the center of the cylindrical lens. It is necessary to design the off-axis cylindrical lens array so that the laser beam divided thereby is superposed on a predetermined plane to form an image having homogeneous intensity distribution on the predetermined plane. The present embodiment explains an example in which the off-axis cylindrical lens array and a cylindrical lens, which is the imaging optical system, are used to form a rectangular beam spot on the irradiated surface so that they act on the direction of the short side of the rectangular beam spot. By using the off-axis cylindrical lens array and the cylindrical lens in combination, the length of the rectangular beam spot in the direction of its short side can be made shorter and the length thereof in the direction of its long side can be made longer. Therefore, the throughput can be increased as described above.

Figure 1:
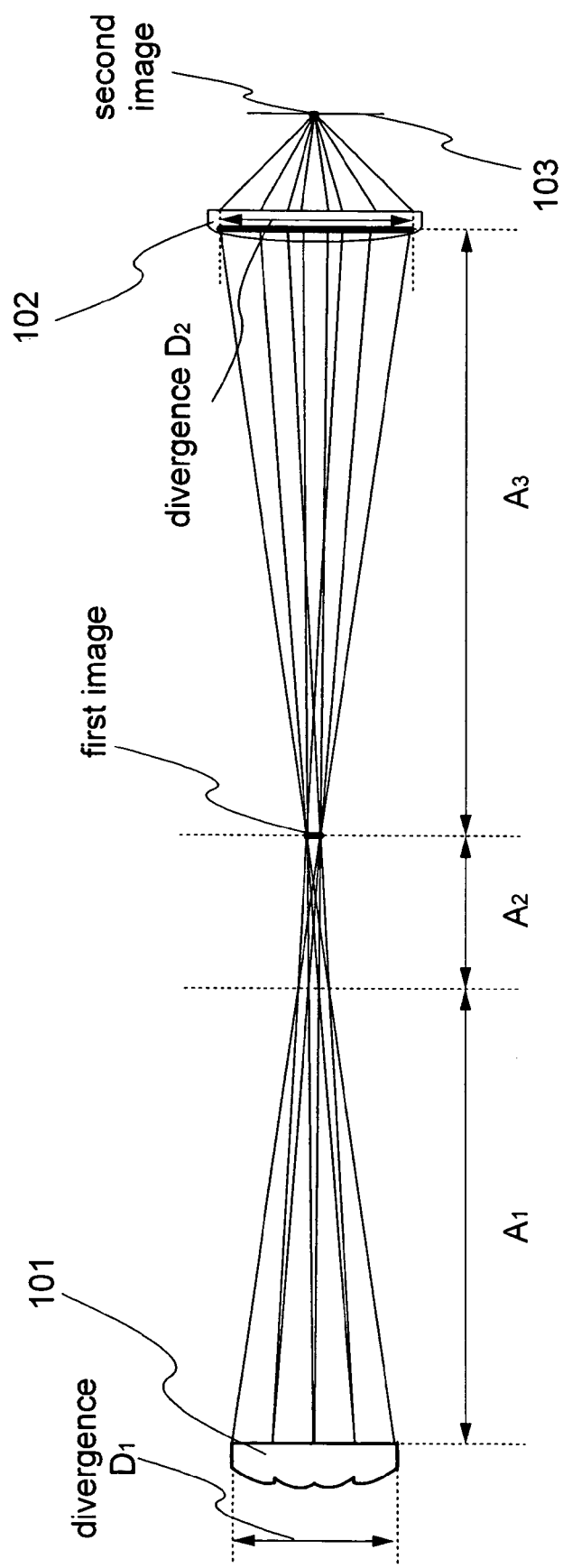
FIG. 1 is a drawing for explaining the embodiment mode of the present invention.

In FIG. 1, an off-axis cylindrical lens array 101 has a focal length of $A_1$ and forms a rectangular image having homogeneous intensity distribution on a plane positioned at a distance of $A_2$ behind the focal point. The rectangular image is referred to as a first image. A cylindrical lens 102 is provided as the imaging optical system at a distance of $A_3$ behind the first image. The cylindrical lens 102 transfers the first image to an irradiated surface 103 and forms a rectangular image having homogeneous intensity distribution on the irradiated surface 103. The rectangular image formed on the irradiated surface 103 is referred to as a second image. In the structure of the present invention shown in FIG. 1, the advantageous effect of the present invention is that a divergence $D_2$ of the laser beam incident into the cylindrical lens 102 can be made much small compared with the conventional technique. In this embodiment mode, this divergence $D_2$ is compared with the divergence in the conventional technique.

Figure 2:
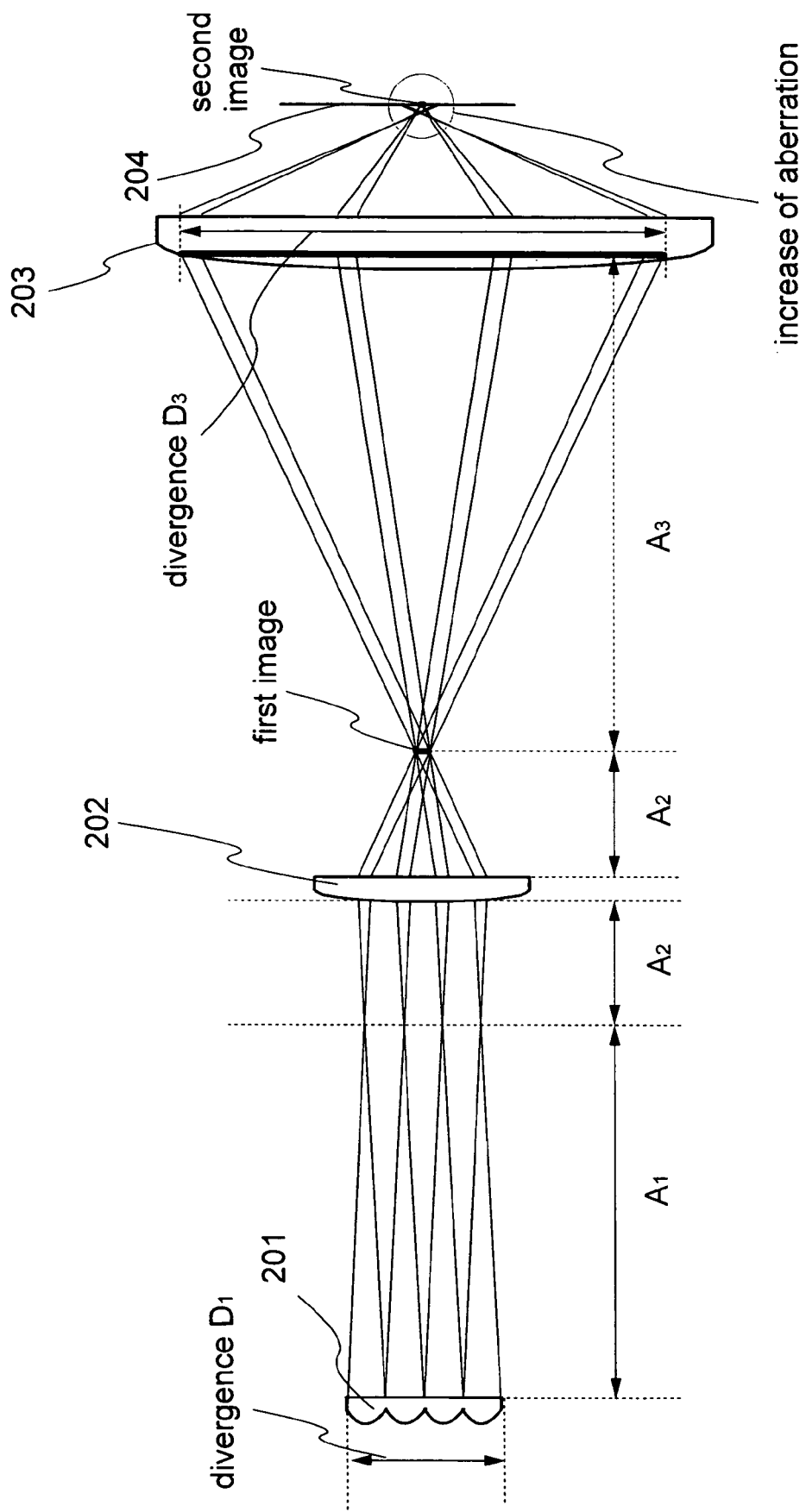
FIG. 2 is a drawing for explaining the embodiment mode of the present invention.

FIG. 2 shows the conventional technique in which a cylindrical lens array and cylindrical lenses are used to form a rectangular beam spot on the irradiated surface. In order to compare the structure of the present invention shown in FIG. 1 with the structure of the conventional technique in FIG. 2, the optical systems in both structures have the same condition (the focal length, the size, the material, and the like). A cylindrical lens array 201 has a focal length of $A_1$, which is the same as that of the off-axis cylindrical lens array 101 shown in FIG. 1. In addition, a cylindrical lens 202 having a focal length of $A_2$ is provided at a distance of $A_2$ behind the focal points of the cylindrical lens array 201, thereby forming a rectangular image (referred to as a first image) having homogeneous intensity distribution. Moreover, a cylindrical lens 203 is set as the imaging optical system at a distance of $A_3$ behind the first image.

In other words, in both FIGS. 1 and 2, the imaging optical system having the same focal length is set at the same distance behind the first image. Moreover, the irradiated surface is set at the same distance behind the imaging optical system, and the second image is formed on the irradiated surface. In FIG. 2, $D_1$ is a divergence of the laser beam incident into the cylindrical lens 202 and $D_3$ is a divergence of the laser beam incident into the cylindrical lens 203, which is the imaging optical system. The respective distances $A_1$, $A_2$, and $A_3$ are determined so that $A_1 > A_2$ and $A_2 < A_3$ because of the following reason. When it is supposed that $A_1 > A_2$, the size of the first image can be made small depending on the ratio between $A_1$ and $A_2$. The size of the first image can be made much smaller when $A_1 >> A_2$. In addition, when it is supposed that $A_2 < A_3$, the second image formed on the irradiated surface can be made smaller with respect to the first image. The size of the second image can be made much smaller when $A_2 << A_3$.

It is preferable to use this structure in the direction of the short side of the rectangular beam spot because narrower beam can be formed. In the structure of the present invention, the divergence $D_2$ is obtained from the proportion $D_1:D_2=(A_1+A_2):A_3$, so $D_2=A_3 \cdot D_1/(A_1+A_2)$. On the other hand, the divergence $D_3$ in FIG. 2 is obtained from the proportion $D_1:D_3=A_2:A_3$, so $D_3=A_3 \cdot D_1/A_2$. When $D_2$ and $D_3$ are compared, it is understood that $D_2$ is smaller than $D_3$ because $D_2$ has larger denominator than $D_3$. For this reason, it is understood that the present invention can make the divergence of the laser beam small. In addition, when $A_1 >> A_2$ and $A_2 << A_3$, $D_3/D_2 = 1 + A_1/A_2 >> 1$, and therfore the advantageous effect is raised. As a result, much smaller beam spot can be obtained.

The small divergence of the laser beam described above is the point at which the present invention is superior to the conventional technique shown in FIG. 2. The reason is explained as follows. When the imaging optical systems are arranged respectively at the same distance from the first image shown in both FIGS. 1 and 2 and when the laser beams are focused so as to form images respectively, it is obvious that the cylindrical lens 203 shown in FIG. 2 is much larger than the cylindrical lens 102 shown in FIG. 1 because of the large divergence of the laser beam. On the other hand, in the example using the present invention shown in FIG. 1, the size of the cylindrical lens 102 can be made small because the divergence of the laser beam is small. By miniaturizing the imaging optical system, it is possible to reduce the cost, to facilitate the maintenance, and to suppress the aberration.

When the size of the imaging optical system is larger, the edge portion of the imaging optical system is farther from the center thereof. Since the image point depends on the incident height of the rays into the optical system, the aberration increases at the focal point as the size of the imaging optical system becomes larger. In FIG. 2, since the size of the imaging optical system 203 is large, the aberration increases on an irradiated surface 204. Therefore, it is difficult to perform the homogeneous annealing. In view of this problem, it is preferable that the size of the cylindrical lens as the imaging optical system is small because the small imaging optical system can suppress the aberration and enlarge the area of the beam spot having the homogeneous intensity distribution on the irradiated surface. In the case of forming the linear beam on the irradiated surface, it is possible to make the linear beam having the homogeneous intensity distribution longer. When the longer linear beam is used to perform the laser annealing to the substrate with the semiconductor film formed thereover, many substrates can be processed in a short time, and therefore the throughput can be raised. Moreover, since the aberration can be suppressed, homogeneous annealing can be performed, and therefore the homogeneous crystallinity can be obtained.

EMBODIMENT 1

This embodiment explains in detail a condition of the optical system described in the embodiment mode of the present invention. Moreover, the present embodiment explains a laser irradiation apparatus using the optical system with reference to FIGS. 3A and 3B.

Figure 3A:
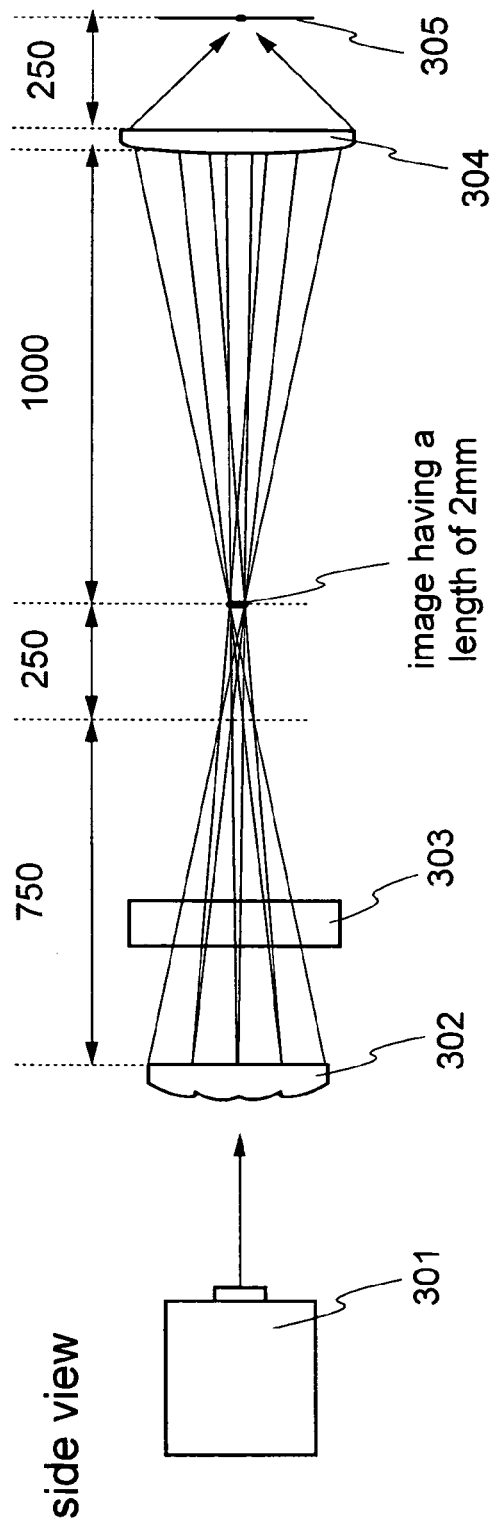
FIGS. 3A and 3B are drawings for explaining the Embodiment 1 of the present invention.

In a side view of FIG. 3A, an example is explained in which the intensity distribution of a linear beam formed on an irradiated surface 305 is homogenized in a direction of a short side of the linear beam using an off-axis cylindrical lens array and a cylindrical lens. Moreover, in a top view of FIG. 3B, an example is explained in which the intensity distribution of the linear beam is homogenized in a direction of its long side using another off-axis cylindrical lens array. An excimer laser is used as the laser oscillator 301. A laser beam emitted from the laser oscillator 301 propagates in a direction indicated by an arrow and is irradiated to the irradiated surface 305 after transmitting through off-axis cylindrical lens arrays 302, 303, and a cylindrical lens 304. The off-axis cylindrical lens array 302 consists of four cylindrical lenses each having a focal length of 750 mm and having a width of 6 mm.

In FIG. 3A, the laser beam emitted from the laser oscillator 301 is incident into the off-axis cylindrical lens 302 and divided into four beams. After that, they are superposed to form an image having homogeneous intensity distribution and having a length of 2 mm. This image is referred to as a first image in this embodiment. The cylindrical lens 304 is a relay lens for transferring the first image to the irradiated surface 305. The size of the cylindrical lens 304 can be made small because the divergence of the laser beam can be suppressed by using the off-axis cylindrical lens array 302 of the present invention. As a result, it is possible to form a beam spot having almost no aberration on the irradiated surface 305. In addition, the cylindrical lens 304 determines the length of the linear beam in the direction of its short side on the irradiated surface 305. In this embodiment, the cylindrical lens 304 is set at a distance of 1000 mm from the first image, and the irradiated surface 305 is set at a distance of 250 mm from the cylindrical lens 304. Therefore, the linear beam has a length of 500 μm in the direction of its short side on the irradiated surface 305.

Figure 3B:
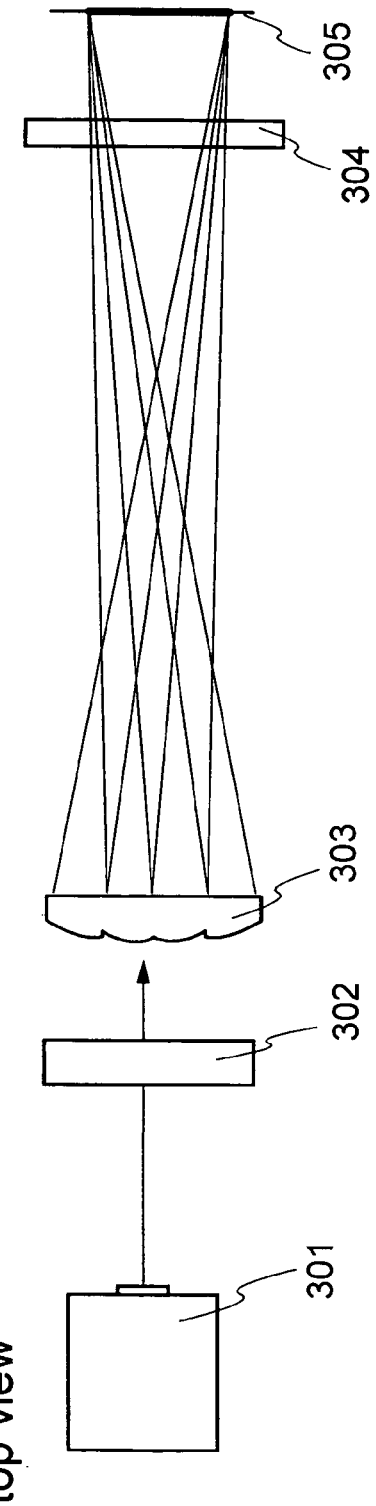
Figure 6A:
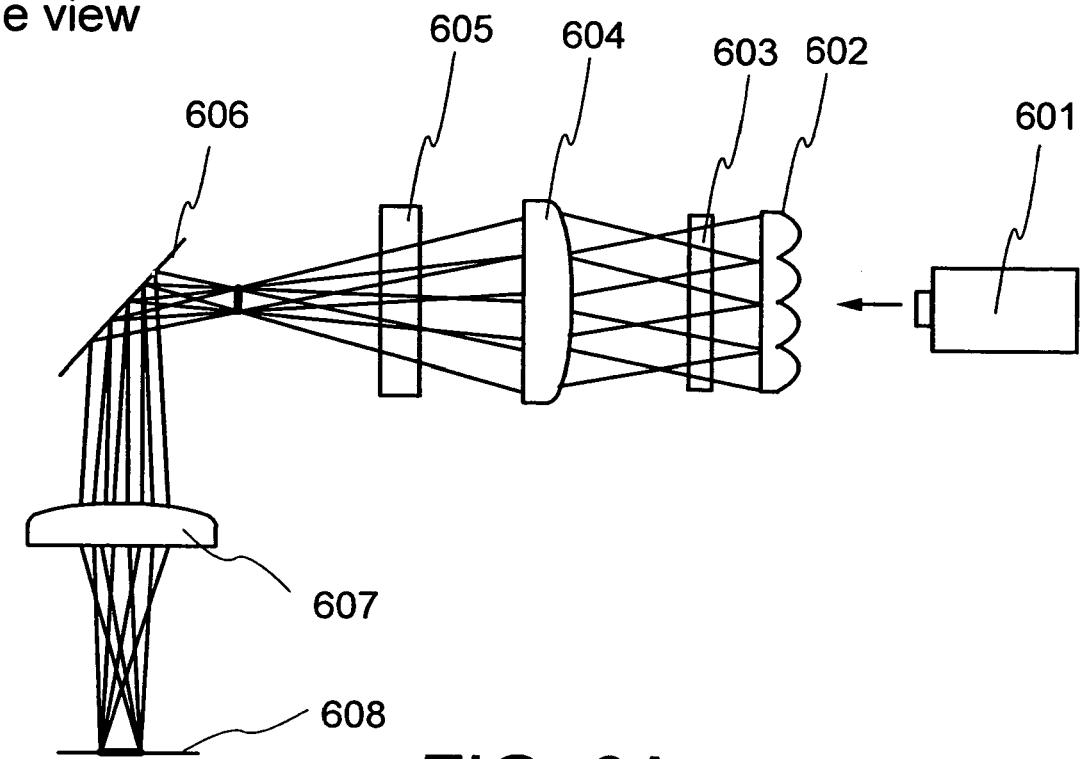
FIGS. 6A and 6B are drawings for explaining a conventional technique.
Figure 6B:
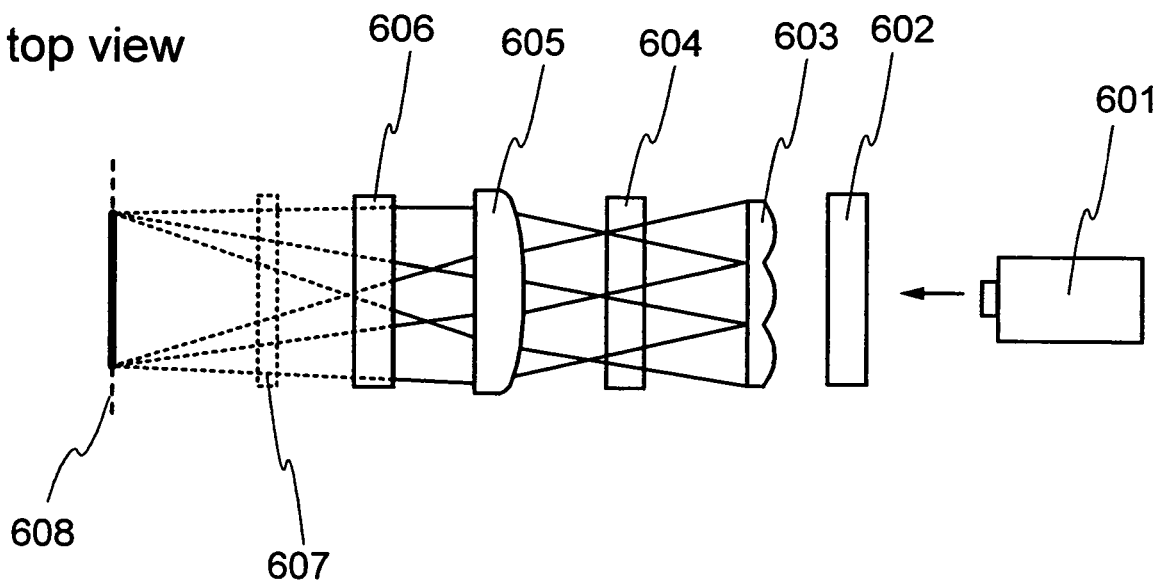

In FIG. 3B, the laser beam emitted from the laser oscillator 301 is incident into the off-axis cylindrical lens array 303 and divided into four beams. After that, they are superposed on the irradiated surface 305 to form an image having homogeneous intensity distribution. The size and the place of the off-axis cylindrical lens array 303 and each cylindrical lens constituting the off-axis cylindrical lens array 303 may be determined in accordance with the desired length of the linear beam in the direction of its long side formed on the irradiated surface 305. When the image is formed using the off-axis cylindrical lens array in the direction of its long side without using the imaging optical system, the aberration due to the imaging optical system can be prevented. Therefore, the beam spot having homogeneous intensity distribution without the effect of the aberration can be formed on the irradiated surface. From this point, it is effective to use the off-axis cylindrical lens array in the direction of the long side.

Thus, the linear beam having homogeneous intensity distribution can be formed on the irradiated surface 305. By applying the present invention, it is possible to suppress the aberration in the directions of the long and short sides of the linear beam, to enlarge the area having homogeneous intensity distribution in the beam spot, and therefore to make the linear beam having homogeneous intensity distribution longer on the irradiated surface. When the longer linear beam is used to perform the annealing to the substrate with the semiconductor film formed thereover, more substrates can be processed in a short time, and therefore the throughput can be raised.

EMBODIMENT 2

The present embodiment explains an example of the laser irradiation apparatus of the present invention using a light pipe with reference to FIG. 4.

In FIG. 4, a laser oscillator 401 is an excimer laser. Reference numerals 402 and 403 denote off-axis cylindrical lens arrays. A light pipe 404 has a pair of reflection planes provided oppositely, which is set so as to act on a direction of a short side of a linear beam spot formed on an irradiated surface 406. The space between the pair of reflection planes is 2 mm. In FIG. 4A, the direction of the short side of the linear beam spot formed on the irradiated surface 406 is parallel to the paper. The space between the pair of reflection planes of the light pipe 404 is filled with the air. The laser beam incident into the light pipe 404 is reflected inside the light pipe 404 repeatedly and the divided laser beams are superposed on the same plane. Thus, the intensity distribution of the laser beam is homogenized at the exit of the light pipe 404 where the divided laser beams are superposed.

In FIG. 4A, a cylindrical lens constituting the off-axis cylindrical lens array 402 is a cylindrical lens whose generating line that is the farthest from the plane surface of the cylindrical lens is not the center of the cylindrical lens. The laser beams divided by this off-axis cylindrical lens array are superposed to form the image having the homogeneous intensity distribution at the entrance of the light pipe 404. This image is referred to as a first image in the present embodiment. The laser beam incident into the light pipe 404 is led to the exit while repeating the reflection inside the light pipe 404 and the image having the homogeneous intensity distribution is formed at the exit of the light pipe 404. The image formed at the exit is referred to as a second image in this embodiment. A cylindrical lens 405 positioned behind the light pipe 404 is a relay lens for transferring the second image to the irradiated surface 406. In this way, the linear beam spot having homogeneous intensity distribution in the direction of its short side is formed on the irradiated surface 406.

In FIG. 4B, the laser beam emitted from the laser oscillator is incident into the off-axis cylindrical lens array 403 and is divided into four. After that, they are superposed at the irradiated surface 406 and the linear beam spot having homogenous intensity distribution in a direction of its long side is formed on the irradiated surface 406. Since the image is formed on the irradiated surface using the off-axis cylindrical lens array in the direction of its long side without using the imaging optical system, the aberration due to the imaging optical system does not occur. Therefore, the beam spot having homogeneous intensity distribution without the effect of the aberration can be formed on the irradiated surface. From this point, it is effective to use the off-axis cylindrical lens array in the direction of the long side.

As shown in the present embodiment, it is preferable to use the off-axis cylindrical lens array in combination with the light pipe because the laser beam can reflect in the light pipe more times so that the intensity distribution can be made more homogeneous.

Moreover, when the laser beams divided by the off-axis cylindrical lens array are not superposed perfectly, the homogeneity of the intensity distribution can be improved by reflecting repeatedly in the light pipe 404. Therefore, the combination of the off-axis cylindrical lens array with the light pipe is preferable because the imperfect superposition can be corrected by the light pipe.

For example, the laser annealing is performed to the semiconductor film as the irradiated surface using the linear beam thus formed. The semiconductor film annealed thus can be used to manufacture an active matrix display for example. The active matrix display may be manufactured by a practitioner according to a known method.

EMBODIMENT 3

The present embodiment explains an example of a laser irradiation apparatus using the off-axis cylindrical lens array of the present invention in combination with the conventional cylindrical lens array with reference to FIGS. 5A and 5B.

In a side view of FIG. 5A, a laser beam emitted from a laser oscillator 501 propagates in a direction indicated by an arrow. An off-axis cylindrical lens array 502 divides the laser beam into four, and the divided beams are superposed on a predetermined plane so that an image having homogeneous intensity distribution is formed on the predetermined plane. A cylindrical lens 505 positioned behind the image transfers the image to an irradiated surface 506. In FIG. 5A, a direction of a short side of the linear beam formed on the irradiated surface 506 is parallel to the paper. When the off-axis cylindrical lens array 502 is set so that it has curvature in the direction of the short side, the following advantage can be obtained. According to the present invention, the cylindrical lens 505 can be miniaturized by using the off-axis cylindrical lens array 502, and therefore the aberration on the irradiated surface 506 can be decreased. By suppressing the aberration, the region in the beam spot having homogeneous intensity distribution that is necessary to anneal the semiconductor film can be enlarged in a direction of the short side of the linear beam spot. The laser annealing method in which the linear beam spot is scanned while being overlapped in the direction of its short side is superior industrially and is usually employed. When the region in the beam spot having homogeneous intensity distribution that is necessary to anneal the semiconductor film is enlarged in the direction of its short side, the annealing can be performed more efficiently. In this embodiment, the off-axis cylindrical lens array is used only in the direction of the short side of the linear beam, however, the off-axis cylindrical lens may be used in the directions of its short and long sides as shown in the embodiments 1 and 2. Moreover, the conventional cylindrical lens array and the cylindrical lens may be used in the direction of its short side, and the off-axis cylindrical lens may be used in the direction of its long side. With the off-axis cylindrical lens array used in the direction of the long side, the aberration can be prevented, and therefore it is possible to enlarge the region in the beam spot having the homogeneous intensity distribution in the direction of its long side and to form a longer linear beam. For this reason, many substrates can be processed in a short time, and the throughput can be raised.

In a top view of the FIG. 5B, the laser beam emitted from the laser oscillator 501 propagates in a direction indicated by an arrow. The laser beam is irradiated to the irradiated surface 506 in such a way that the laser beam is divided into three by a cylindrical lens array 503 and they are condensed by a cylindrical lens 504. In FIG. 5B, a direction of the long side of the linear beam formed on the irradiated surface 506 is parallel to the paper.

Thus, the linear beam having homogeneous intensity distribution can be formed on the irradiated surface 506 even when the off-axis cylindrical lens array of the present invention is used in combination with the conventional cylindrical lens array.

The laser annealing is performed to the semiconductor film as the irradiated surface using the linear beam formed thus for example. This semiconductor film can be used to manufacture an active matrix display for example. The active matrix display may be manufactured by a practitioner according to a known method.

EMBODIMENT 4

The present embodiment explains a process for manufacturing a thin film transistor using the laser irradiation apparatus of the present invention with reference to FIGS. 7A to 9E.

Initially, a base film 701 is formed over a substrate 700 as shown in FIG. 7A. A glass substrate such as a barium borosilicate glass or an alumino borosilicate glass, a quartz substrate, an SUS substrate, or the like can be used as the substrate 700 for example. In addition, although a substrate made of flexible synthetic resin such as plastic tends to be inferior to the above substrates in point of the resistance against the heat, the substrate made of flexible synthetic resin may be used when it can resist the heat in the manufacturing process.

The base film 701 is provided in order to prevent the alkali-earth metal or alkali metal such as Na included in the substrate 700 from diffusing into the semiconductor film and from causing an adverse effect on the characteristic of the semiconductor element. Therefore, the base film is formed of an insulating material such as silicon oxide, silicon nitride, or silicon nitride oxide, which can suppress the diffusion of the alkali-earth metal and alkali metal into the semiconductor film. In the present embodiment, a silicon nitride oxide film is formed in thickness from 10 to 400 nm by a plasma CVD method.

It is noted that the base film 701 may be formed of a single insulating film or may be formed by laminating a plurality of insulating films. In the case of using the substrate including the alkali metal or the alkali-earth metal in any way such as the glass substrate, the SUS substrate, or the plastic substrate, it is effective to provide the base film in terms of preventing the diffusion of the impurity. When the diffusion of the impurity does not lead to any significant problems, for example when the quartz substrate is used, the base film is not always necessary to be provided.

Next, an amorphous semiconductor film 702 is formed over the base film in thickness from 25 to 100 nm (preferably from 30 to 60 nm). Silicon or silicon germanium is used as the amorphous semiconductor film 702. After that, a heat treatment is performed at a temperature of 500° C. for one hour to dehydrogenate the amorphous semiconductor film 702.

Next, a crystalline semiconductor film 703 is formed by crystallizing the amorphous semiconductor film 702 using the laser irradiation apparatus of the present invention. An excimer laser is used in the laser crystallization process of this embodiment. After the laser beam emitted from the excimer laser is shaped into rectangular using the optical system, the semiconductor film is irradiated with the rectangular beam spot. Specifically, the off-axis cylindrical lens array and the cylindrical lens of the present invention are used to form a rectangular beam spot whose long side has the length from 100 to 1000 mm and short side has the length from 200 to 5000 μm on an irradiated surface. In this embodiment, the beam spot is transformed into a linear beam spot whose long side has a length of 300 mm and short side has a length of 400 μm and irradiated. On this occasion, the overlapping ratio of the linear beam is determined in the range of 50 to 98%, and it is 90% in this embodiment. In addition, the energy density of the laser beam is set in the range of 100 to 1000 mJ/cm$^2$, and it is set to 350 mJ/cm$^2$ using an attenuator in this embodiment. The repetition rate (the number of the pulse oscillations per one second) is set in the range of 10 to 1000 Hz, and it is set to 300 Hz in this embodiment. After heating the substrate in the atmosphere of nitrogen at a temperature of 500° C. for one hour, the laser annealing is performed to crystallize the semiconductor film in this embodiment. Thus, a crystalline semiconductor film is formed. It is desirable to irradiate the semiconductor film with the laser beam while moving the stage at the speed from approximately 1 to 500 mm/s, and it is set to 12 mm/s in this embodiment. By applying the present invention, the aberration on the semiconductor film, which is the irradiated surface, can be reduced, and more homogeneous laser annealing can be performed. Therefore, the homogeneous crystallinity can be obtained.

The crystalline semiconductor film obtained thus is patterned into a desired shape, and semiconductor layers 704 to 707 are formed. After that, a gate insulating film 708 covering the semiconductor layers 704 to 707 is formed. The gate insulating film 708 is formed of an insulating film including silicon in thickness from 30 to 200 nm by a sputtering method.

Figure 8A:
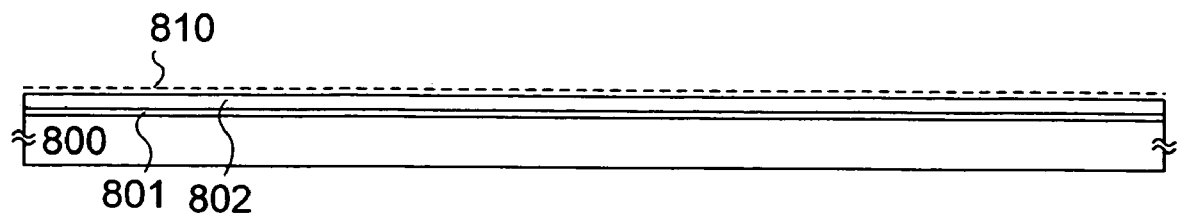
FIGS. 8A to 8D are drawings for showing manufacturing processes of the thin film transistor.

Subsequently, a method for forming the crystalline semiconductor film that is different from the above method is explained with reference to FIGS. 8A to 8D. In this case, a base film 801 is formed over a substrate 800 according to the same process as that shown in FIG. 7A. As the substrate 800, a glass substrate such as a barium borosilicate glass or an aluminoborosilicate glass, a quartz substrate, an SUS substrate, or the like can be used. Then, an amorphous semiconductor film 802 is formed over the base film 801. (FIG. 8A)

In this method, a nickel acetate solution 810 including Ni in the range of 1 to 100 ppm in weight is applied to the surface of the amorphous semiconductor film 802 by a spin coating method. It is noted that the catalyst may be added not only by the above method but also by another method such as a sputtering method, a vapor deposition method, or a plasma process.

Next, a heat treatment is performed at temperatures ranging from 500 to 650° C. for 4 to 24 hours, for example at a temperature of 550° C. for 14 hours. This heat treatment forms a crystalline semiconductor in which the crystallization is promoted vertically from the surface with the nickel acetate solution 810 applied thereon toward the substrate 800. Although the present embodiment uses nickel as the catalyst element, the present invention is not limited to this, and another element such as germanium (Ge), iron (Fe), palladium (Pd), tin (Sn), lead (Pb), cobalt (Co), platinum (Pt), copper (Cu), or gold (Au) may be used.

Figure 8B:
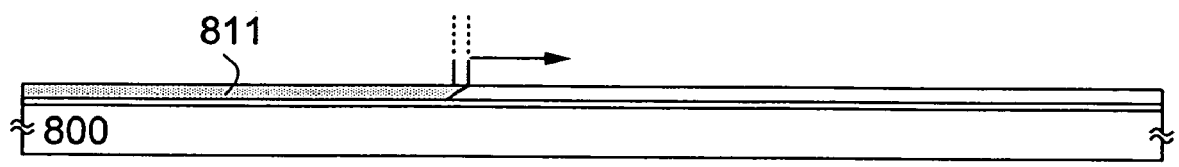

Next, as explained above, the laser beam is emitted from the excimer laser to irradiate the crystalline semiconductor and to enhance its crystallinity. Thus, a crystalline semiconductor film 811 is formed (FIG. 8B). It is considered that the crystalline semiconductor film 811 formed thus includes the catalyst element (herein Ni) at a density of approximately $1 \times 10^{19}$ atoms/cm$^3$. Consequently, the gettering of the catalyst element existing in the crystalline semiconductor film 811 is performed next.

Figure 8C:
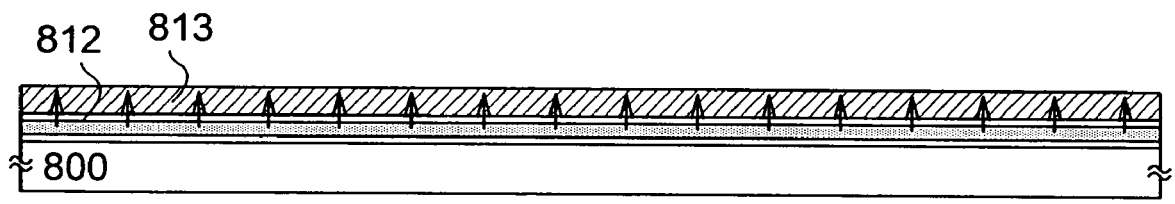

First, as shown in FIG. 8C, an oxide film 812 is formed over the crystalline semiconductor film 811. By forming the oxide film 812 in thickness from approximately 1 to 10 nm, it is possible to prevent the surface of the crystalline semiconductor film 811 from becoming rough in the following etching process.

The oxide film 812 can be formed by a known method. For example, the oxide film 812 may be formed by oxidizing the surface of the crystalline semiconductor film 811 using ozone water or using a solution in which a hydrogen peroxide solution is mixed with sulfuric acid, hydrochloric acid, nitric acid, or the like. Moreover, the oxide film 812 may be formed by a plasma process, a heat treatment, ultraviolet ray irradiation, or the like in the atmosphere including oxygen. Furthermore, the oxide film 812 may be separately formed by the plasma CVD method, the sputtering method, the vapor deposition method, or the like.

A semiconductor film 813 for the gettering in which the noble gas element is added at a density of $1 \times 10^{20}$ atoms/cm$^3$ or more is formed in thickness from 25 nm to 250 nm over the oxide film 812 by the sputtering method. It is desirable that the mass density of the semiconductor film 813 for the gettering is lower than that of the crystalline semiconductor film 811 in order to increase the selecting ratio to the crystalline semiconductor film 811 in the etching process. As the noble gas element, one kind or plural kinds selected from the group consisting of helium (He), neon (Ne), argon (Ar), krypton (Kr), and xenon (Xe) are used.

Next, the gettering is performed by a heat treatment using a furnace annealing method or an RTA method. When the furnace annealing method is employed, the heat treatment is performed for 0.5 to 12 hours at temperatures ranging from 450 to 600° C. in the atmosphere of nitrogen. When the RTA method is employed, a lamp light source for heating is turned on for 1 to 60 seconds, preferably for 30 to 60 seconds, which is repeated from 1 to 10 times, preferably from 2 to 6 times. The luminance intensity of the lamp light source is determined so that the semiconductor film is heated instantaneously at temperatures ranging from 600 to 1000° C., preferably from 700 to 750° C.

By the heat treatment, the catalyst element inside the crystalline semiconductor film 811 moves to the semiconductor film 813 for the gettering due to the diffusion as indicated by an arrow, and the catalyst element is thus gettered.

Next, the semiconductor film 813 for the gettering is removed by etching selectively. The etching can be performed by dry etching using $CIF_3$ without using plasma or by wet etching using an alkali solution such as a solution including hydrazine or tetraethylammonium hydroxide (chemical formula $(CH_3)_4NOH$). On this occasion, the oxide film 812 can prevent the crystalline semiconductor film 811 from being etched.

Figure 8D:
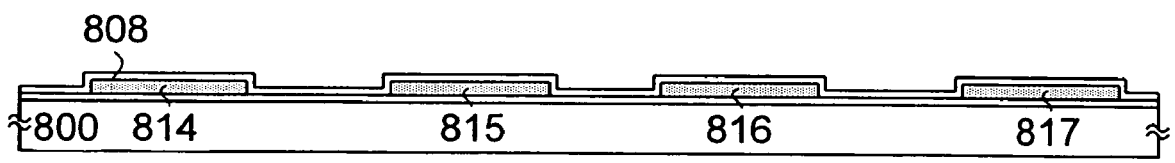

Next, after the oxide film 812 is removed by hydrofluoric acid, the crystalline semiconductor film 811 is patterned to form island-shaped semiconductor layers 814 to 817 (FIG. 8D). After that, a gate insulating film 808 covering the island-shaped semiconductor layers 814 to 817 is formed. For example, an insulating film including silicon formed in thickness from 30 to 200 nm by the sputtering method may be used as the gate insulating film 808.

It is noted that the gettering method is not limited to that shown in this embodiment. Another method may be employed to decrease the catalyst element in the semiconductor film.

Figure 9A:
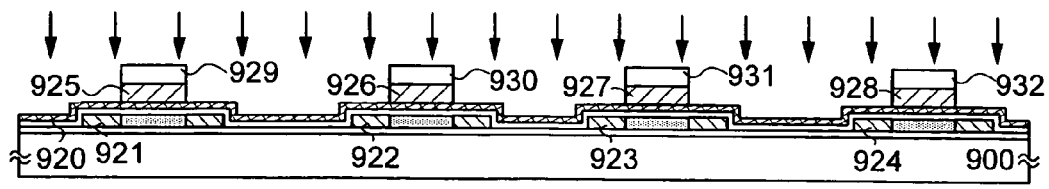
FIGS. 9A to 9E are drawings for showing manufacturing processes of the thin film transistor.

Subsequently, a first conductive film 920 is formed of a known conductive material such as an element selected from the group consisting of Ta, W, Ti, Mo, Al, Cu, Cr and Nd; a chemical compound material or an alloy material including the above element as its main component; a semiconductor film, typically a poly-crystalline silicon film, with the impurity element such as phosphorus doped; or AgPdCu alloy. The film thickness of the first conductive film 920 is in the range of 20 to 100 nm (FIG. 9A). Next, a second conductive film is formed in thickness from 100 to 400 nm and a silicon nitride film is formed thereon in thickness from 100 to 400 nm so that they cover the first conductive film 920. Subsequently, the silicon nitride film is patterned to form insulating layers 929 to 932. It is noted that not only silicon nitride but also silicon oxide may be used as the material of the insulating layers 929 to 932. More specifically, when the silicon oxide film is used, the insulating layers are formed by patterning the silicon oxide film using a phosphoric etchant. When the silicon nitride film is used, the insulating layers are formed by patterning the silicon nitride film using a hydrofluoric acid etchant. Next, conductive layers 925 to 928 are formed by patterning the second conductive film using the insulating layers 929 to 932 as a mask.

Then, a doping process is performed. In this process, an impurity element imparting n-type and belonging to 15th group such as phosphorous or arsenic is doped in the semiconductor layers 814 to 817 at low density. On this occasion, the conductive layers 925 to 928 and the insulating layers 929 to 932 become the mask against the impurity element imparting n-type. Thus, impurity regions 921 to 924 are formed in a self-aligning manner in which the density of the impurity element imparting n-type ranges from $1\times10^{18}$ to $1\times10^{20}$ atoms/cm$^3$.

Figure 9B:
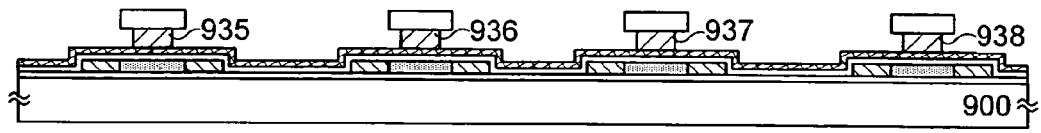
Figure 9C:
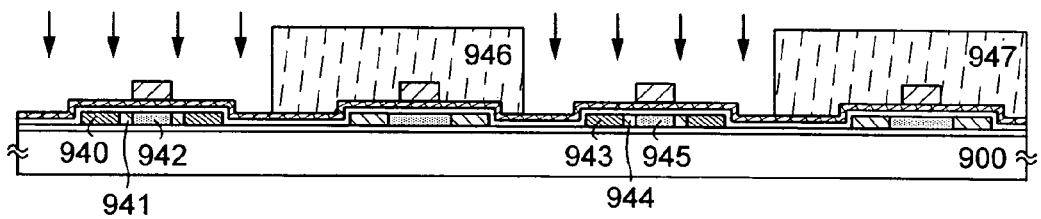

The etching is performed selectively to recede the conductive layers 925 to 928 and to form conductive layers 935 to 938 (FIG. 9B). After that, the insulating layers 929 to 932 functioning as the mask are etched away (FIG. 9C). Subsequently, resist masks 946 and 947 are formed and a doping process is performed at higher accelerating voltage than that in the above doping process. When the doping process is performed using the conductive layers 935 and 937 as the mask, the impurity element is added at the density from $1\times10^{18}$ to $5\times10^{19}$ atoms/cm$^3$ in impurity regions 941 and 944 (N$^-$ region, LDD region) and the impurity element imparting n-type is added at the density from $1\times10^{19}$ to $5\times10^{21}$ atoms/cm$^3$ in impurity regions 940 and 943 (N$^+$ region, LDD region). Moreover, channel-forming regions 942 and 945 are formed.

Figure 9D:
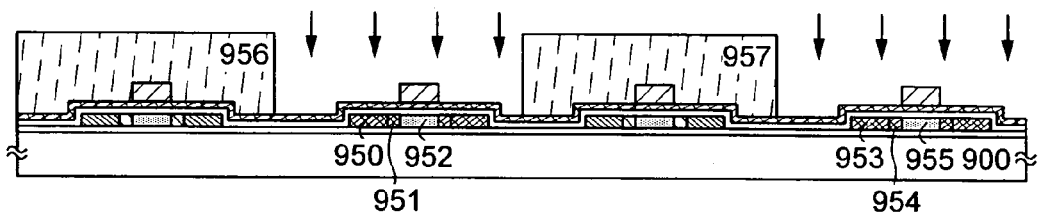

Next, after removing the resist masks 946 and 947, new resist masks 956 and 957 are formed (FIG. 9D). After that, a doping process is performed, and an impurity region in which an impurity element imparting the conductivity type opposite to the above conductivity type is added is formed in the semiconductor layer that becomes an active layer of the p-channel TFT. In this process, an impurity element imparting p-type is added using the conductive layers 936 and 938 as the mask, and impurity regions (P$^+$ region) 950 and 953, impurity regions (P$^-$ region) 951 and 954, and channel-forming regions 952 and 955 are formed in a self-aligning manner. This doping process is performed so that the density of the impurity imparting p-type ranges from $1\times10^{19}$ to $5\times10^{21}$ atoms/cm$^3$. The conditions of the doping process are not limited to those described above, and the doping process may be performed twice or more.

Figure 9E:
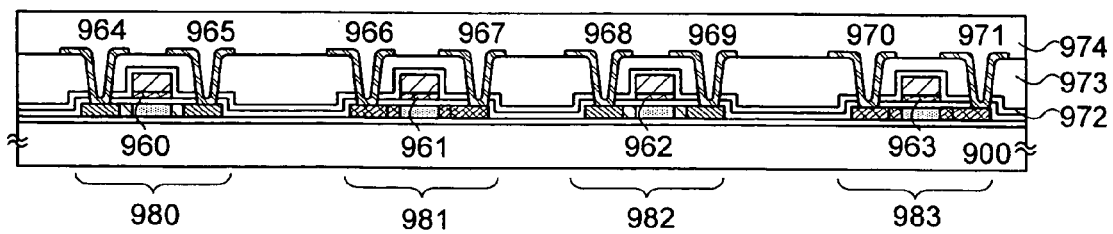

Next, the resist masks 956 and 957 are removed, and the first conductive film 920 is etched anisotropically using the conductive layers 935 to 938 as the mask to form conductive layers 960 to 963 (FIG. 9E). The above processes can form n-channel transistors 980 and 982 and p-channel transistors 981 and 983 over the same substrate.

Then, an insulating film 972 is formed as a protective film. The insulating film 972 is formed of a single layer or a multilayer of an insulating film including silicon in thickness from 100 to 200 nm by a plasma CVD method or a sputtering method. In this embodiment, the insulating film 972 is formed of a silicon oxynitride film in 100 nm thick by the plasma CVD method. After that, a heat treatment may be performed in order to recover the crystallinity of the semiconductor layer or to activate the impurity element added in the semiconductor layer.

Next, an organic insulating film 973 is formed over the insulating film 972. The organic insulating film 973 is formed of an organic insulating material such as polyimide, polyamide, BCB, or acrylic. It is preferable to use a film that can be easily flattened as the organic insulating film 973 because the organic insulating film 973 is formed in order to relax the concavity and convexity due to the TFT formed over the substrate 900 and to flatten them.

Next, a contact holes that reaches the impurity regions 940, 943, 950, and 953 are formed by patterning the insulating film 972 and the organic insulating film 973 according to a photolithography method. Then, a conductive film is formed of a conductive material, and wirings 964 to 971 are formed by patterning the conductive film. After that, an insulating film 974 is formed as a protective film. Thus, a semiconductor device illustrated in the figure is obtained.

It is preferable that the transistor used for a functional circuit such as a driver or a CPU has an LDD structure or a structure in which the LDD overlaps the gate electrode. For higher-speed operation, it is preferable that the transistor is miniaturized. Since the transistors 980 to 983 that are completed by the present embodiment have the LDD structure, they are preferably employed in the driver circuit requiring the high-speed operation. Moreover, with the miniaturization, it is necessary to make the gate insulating film 808 thinner. In the present embodiment, the doping process is performed under the condition where the gate insulating film 808 is covered by the first conductive film 920, and therefore the gate insulating film 808 is protected. As a result, the manufacturing method of the present embodiment is also effective to miniaturize the transistor.

EMBODIMENT 5

This embodiment explains a semiconductor device in which an active matrix type display device including a TFT circuit according to the present invention is incorporated with reference to FIGS. 10, 11 and 12.

As the example of such a semiconductor device, a personal digital assistant (such as an electronic book, a mobile computer, a cellular phone and the like), a video camera, a still camera, a digital camera, a personal computer, a television and the like are given. FIGS. 10, 11 and 12 show these examples.

Figure 10A:
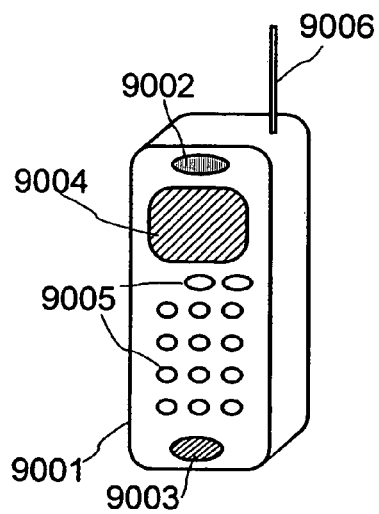
FIGS. 10A to 10E are drawings for showing electronic appliances to which the present invention can be applied.

FIG. 10A shows a cellular phone, including a main body 9001, a voice output portion 9002, a voice input portion 9003, a display device 9004, operating switches 9005, and an antenna 9006. The present invention can be applied to the voice output portion 9002, the voice input portion 9003, and the display device 9004 equipped with the active matrix substrate.

Figure 10B:
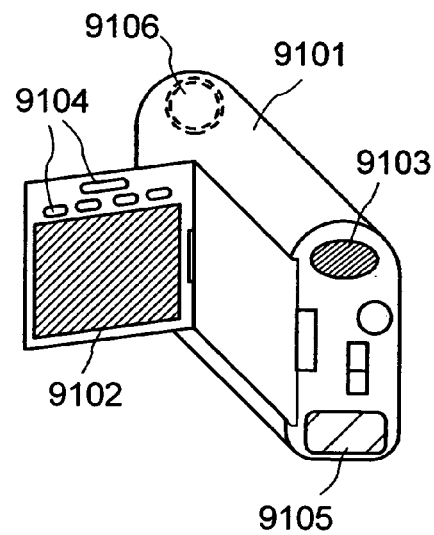

FIG. 10B shows a video camera, including a main body 9101, a display device 9102, a voice input portion 9103, operating switches 9104, a battery 9105, and an image receiver 9106. The present invention can be applied to the voice input portion 9103, the display device 9102 equipped with the active matrix substrate, and the image receiver 9106.

Figure 10C:
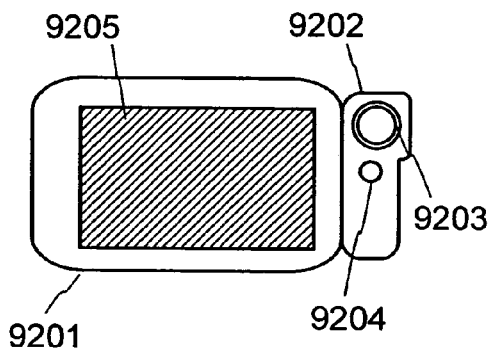

FIG. 10C shows a mobile computer or a personal digital assistant, including a main body 9201, a camera portion 9202, an image receiver 9203, an operating switch 9204, and a display device 9205. The present invention can be applied to the image receiver 9203 and the display device 9205 equipped with the active matrix substrate.

Figure 10D:
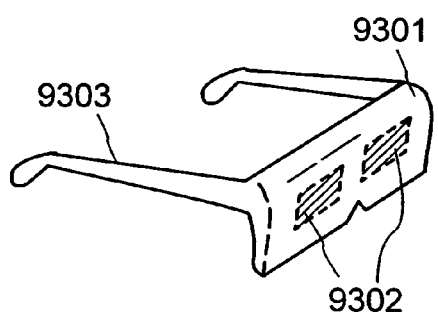

FIG. 10D shows a goggle type display, including a main body 9301, a display device 9302, and an arm portion 9303. The present invention can be applied to the display device 9302. In addition, it can be applied to other signal controlling circuits though they are not shown.

Figure 10E:
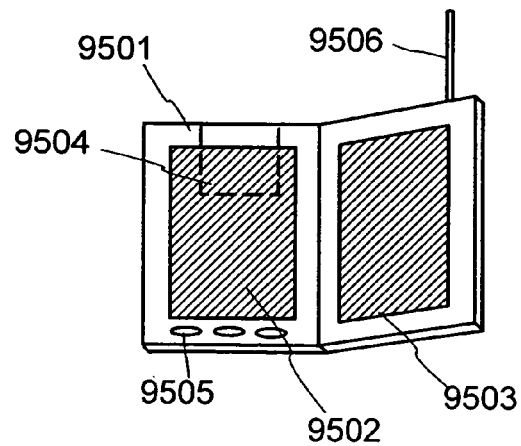

FIG. 10E shows a mobile book, including a main body 9501, display devices 9502 and 9503, a recording medium 9504, an operating switch 9505, and an antenna 9506. The mobile book is to display the data recorded in a minidisk (MD) and DVD or the data received with the antenna. The present invention can be applied to the display devices 9502 and 9503, which are direct view.

Figure 11A:
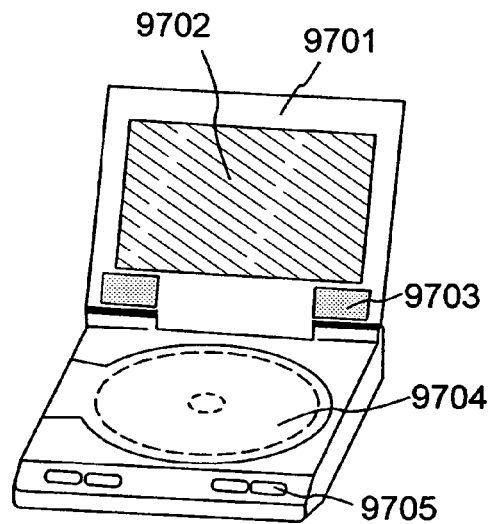
FIGS. 11A to 11C are drawings for showing electronic appliances to which the present invention can be applied.

FIG. 11A shows a player utilizing a recording medium that has a program recorded (hereinafter referred to as a recording medium) including a main body 9701, a display device 9702, a speaker portion 9703, a recording medium 9704, and an operating switch 9705. It is noted that this player makes it possible to enjoy listening to the music, watching the movies, playing the game, and playing on the Internet using a DVD (Digital Versatile Disc), CD or the like as its recording medium.

Figure 11B:
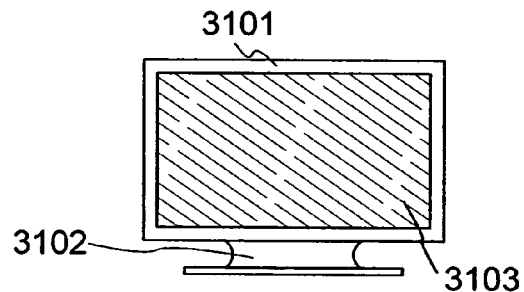

FIG. 11B shows a television, including a main body 3101, a supporting stand 3102, and a display portion 3103.

Figure 11C:
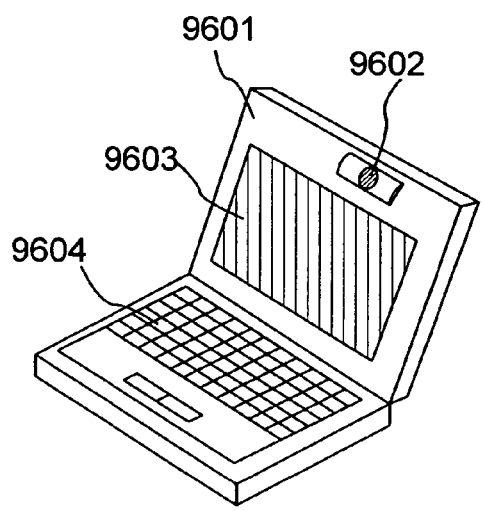

FIG. 11C shows a personal computer, including a main body 9601, an image input portion 9602, a display device 9603, and a keyboard 9604.

Figure 12A:
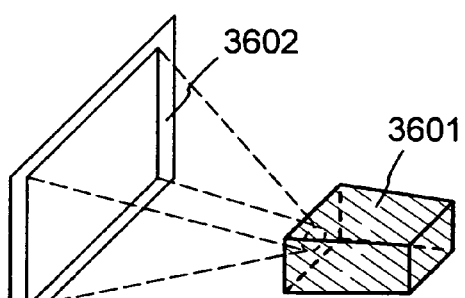
FIGS. 12A to 12D are drawings for showing electronic appliances to which the present invention can be applied.

FIG. 12A shows a front projector, including a projection device 3601, and a screen 3602. The present invention can be applied to a display device and other signal controlling circuits.

Figure 12B:
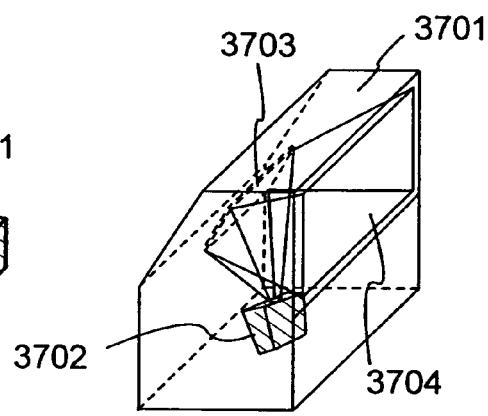

FIG. 12B shows a rear projector, including a main body 3701, a projection device 3702, a mirror 3703, and a screen 3704. The present invention can be applied to a display device and other signal controlling circuits.

Figure 12C:
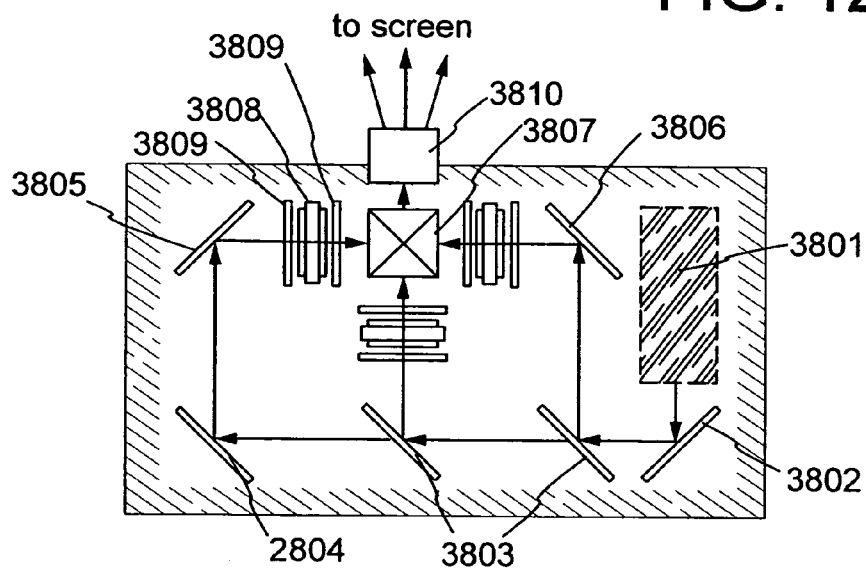

It is noted that FIG. 12C is a drawing to show an example of the structure of the projection device 3601 in FIG. 12A and the projection device 3702 in FIG. 12B. The projection devices 3601 and 3702 include an optical system of a light source 3801, mirrors 3802, 3804 to 3806, a dichroic mirror 3803, a prism 3807, a liquid crystal display device 3808, a wave plate 3809, and a projection optical system 3810. The projection optical system 3810 has an optical system including a projection lens. This example showed the projection device of three-plate type, but there is no limitation on this, and the projection device of single-plate type is also acceptable. Moreover, the practitioner may arbitrarily arrange an optical system such as an optical lens, a film having a polarizing function, a film for adjusting phase contrast, an IR film or the like in the optical path shown by an arrow in FIG. 12C.

Figure 12D:
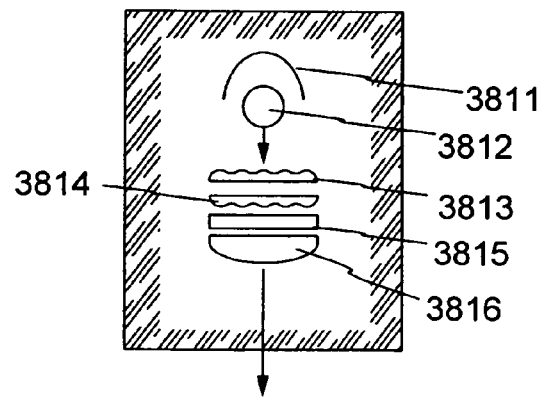

Moreover, FIG. 12D shows an example of the structure of the optical system of light source 3801 in FIG. 12C including a reflector 3811, a light source 3812, lens arrays 3813, 3814, a polarization changing element 3815, and a converging lens 3816. It is noted that the optical system of light source shown in FIG. 12D is just one of the examples, and there is no particular limitation to that described above. For example, the practitioner may provide an optical system such as an optical lens, a film having a polarizing function, a film for adjusting phase contrast, an IR film or the like in the optical system of the source appropriately.

Furthermore, the present invention can be also applied to a display element of light-emitting type. As described above, the present invention can be applied to various kinds of devices, and can be applied to the electronics device in every field. It is noted that the electronics device in this embodiment can be freely combined with any of the embodiments 1 to 4.

This application is based on Japanese Patent Application serial No. 2003-391443 filed in Japan Patent Office on 20th, Nov., 2003, the contents of which are hereby incorporated by reference.

Although the invention has been fully described by way of Embodiment and with reference to the accompanying drawings, it is to be understood that various changes and modifications will be apparent to those skilled in the art. Therefore, unless such changes and modifications depart from the scope of the invention hereinbefore defined, they should be constructed as being included therein.

What is claimed is:

1. A method for manufacturing a semiconductor device comprising the steps of:
   forming a non-single crystal semiconductor film over a substrate; and
   performing a laser annealing to the non-single crystal semiconductor film,
   wherein an image having a homogeneous intensity distribution is formed on a predetermined plane by an off-axis lens array, and
   wherein the image is transferred to the non-single crystal semiconductor film by an imaging optical system which is positioned behind the predetermined plane.

2. The method for manufacturing a semiconductor device according to claim 1,
   wherein a principal point of a lens constituting the off-axis lens array is misaligned from a center of the lens.

3. The method for manufacturing a semiconductor device according to claim 1,
   wherein the image having the homogeneous intensity distribution is rectangular.

4. The method for manufacturing a semiconductor device according to claim 1,
   wherein an off-axis cylindrical lens array is used as the off-axis lens array, and wherein a cylindrical lens is used as the imaging optical system.

5. The method for manufacturing a semiconductor device according to claim 4,
wherein the off-axis cylindrical lens array has curvature in a direction of a short side of a rectangular image having the homogeneous intensity distribution, and
wherein the cylindrical lens has curvature in the direction of the short side of the rectangular image having the homogeneous intensity distribution.

6. The method for manufacturing a semiconductor device according to claim 1,
wherein the semiconductor device is applied to an electronic apparatus selected from the group consisting of a personal digital assistant, a video camera, a still camera, a digital camera, a personal computer, a television, a goggle type display, a mobile book, a player utilizing a recording medium, a front projector and a rear projector.

7. A method for manufacturing a semiconductor device comprising the steps of:
forming a non-single crystal semiconductor film over a substrate; and
performing a laser annealing to the non-single crystal semiconductor film,
wherein a laser beam is divided by an off-axis cylindrical lens array and divided laser beams are superposed on the non-single crystal semiconductor film so that a rectangular image having an intensity distribution homogenized is formed on the non-single crystal semiconductor film, and
wherein the off-axis cylindrical lens array has curvature in a direction of a long side of the rectangular image.

8. The method for manufacturing a semiconductor device according to claim 7,
wherein a principal point of a cylindrical lens constituting the off-axis cylindrical lens array is misaligned from a center of the cylindrical lens.

9. The method for manufacturing a semiconductor device according to claim 7,
wherein the laser beam is emitted from an excimer laser.

10. The method for manufacturing a semiconductor device according to claim 7,
wherein the semiconductor device is applied to an electronic apparatus selected from the group consisting of a personal digital assistant, a video camera, a still camera, a digital camera, a personal computer, a television, a goggle type display, a mobile book, a player utilizing a recording medium, a front projector and a rear projector.

11. A method for manufacturing a semiconductor device comprising the steps of:
forming a non-single crystal semiconductor film over a substrate; and
performing a laser annealing to the non-single crystal semiconductor film,
wherein a first off-axis cylindrical lens array, an imaging optical system and a second off-axis cylindrical lens array are used so that a first rectangular image is formed on the non-single crystal semiconductor film,
wherein the first off-axis cylindrical lens array divides a laser beam emitted from a laser oscillator in a direction of a short side of the first rectangular image and superposes divided laser beams on a predetermined plane so that a second rectangular image having an intensity distribution homogenized in a direction of a short side of the second rectangular image is formed on the predetermined plane,
wherein the imaging optical system transfers the second rectangular image formed on the predetermined plane to the non-single crystal semiconductor film, and
wherein the second off-axis cylindrical lens array divides the laser beam emitted from the laser oscillator in a direction of a long side of the first rectangular image and superposes divided laser beams on the non-single crystal semiconductor film so that the first rectangular image having an intensity distribution homogenized in the direction of the long side of the first rectangular image is formed on the non-single crystal semiconductor film.

12. The method for manufacturing a semiconductor device according to claim 11,
wherein a principal point of a cylindrical lens constituting the first off-axis cylindrical lens array and the second off-axis cylindrical lens array is misaligned from a center of the cylindrical lens.

13. The method for manufacturing a semiconductor device according to claim 11,
wherein the laser beam is emitted from an excimer laser.

14. The method for manufacturing a semiconductor device according to claim 11,
wherein the semiconductor device is applied to an electronic apparatus selected from the group consisting of a personal digital assistant, a video camera, a still camera, a digital camera, a personal computer, a television, a goggle type display, a mobile book, a player utilizing a recording medium, a front projector and a rear projector.

15. A method for manufacturing a semiconductor device comprising the steps of:
forming a non-single crystal semiconductor film over a substrate; and
performing a laser annealing to the non-single crystal semiconductor film,
wherein an image having a homogeneous intensity distribution is formed on a predetermined plane by an off-axis lens array including at least a first off-axis lens which has a first shape and a second off-axis lens which has a second shape, and
wherein the image is transferred to the non-single crystal semiconductor film by an imaging optical system which is positioned behind the predetermined plane.

16. The method for manufacturing a semiconductor device according to claim 15,
wherein principal points of the first off-axis lens and the second off-axis lens constituting the off-axis lens array are misaligned from centers of the first off-axis lens and the second off-axis lens respectively.

17. The method for manufacturing a semiconductor device according to claim 15,
wherein the image having the homogeneous intensity distribution is rectangular.

18. The method for manufacturing a semiconductor device according to claim 15,
wherein an off-axis cylindrical lens array is used as the off-axis lens array,
wherein a first off-axis cylindrical lens is used as the first off-axis lens and a second off-axis cylindrical lens is used as the second off-axis lens, and
wherein a cylindrical lens is used as the imaging optical system.

19. The method for manufacturing a semiconductor device according to claim 18,
wherein the off-axis cylindrical lens array has curvature in a direction of a short side of a rectangular image having the homogeneous intensity distribution, and wherein the cylindrical lens has curvature in the direction of the short side of the rectangular image having the homogeneous intensity distribution.

20. The method for manufacturing a semiconductor device according to claim 15,
wherein the semiconductor device is applied to an electronic apparatus selected from the group consisting of a personal digital assistant, a video camera, a still camera, a digital camera, a personal computer, a television, a goggle type display, a mobile book, a player utilizing a recording medium, a front projector and a rear projector.

* * * * *